(12) United States Patent
Kroening

(10) Patent No.: US 7,487,348 B2
(45) Date of Patent: Feb. 3, 2009

(54) SYSTEM FOR AUTHENTICATING AND SCREENING GRID JOBS ON A COMPUTING GRID

(75) Inventor: James L. Kroening, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 866 days.

(21) Appl. No.: 10/423,128

(22) Filed: Apr. 25, 2003

(65) Prior Publication Data

US 2004/0215973 A1 Oct. 28, 2004

(51) Int. Cl.
*H04L 9/00* (2006.01)
*H04K 1/00* (2006.01)

(52) U.S. Cl. .............................. 713/150; 726/2; 726/5; 726/6; 726/7; 726/8; 726/9; 726/10

(58) Field of Classification Search ............... 726/5–10, 726/2; 713/150–203; 712/1–43, 200–203; 709/201–211, 246
See application file for complete search history.

(56) References Cited

U.S. PATENT DOCUMENTS

| | | | |
|---|---|---|---|
| 5,560,008 A * | 9/1996 | Johnson et al. ................. | 726/5 |
| 6,105,110 A | 8/2000 | Watkins et al. | |
| 6,466,947 B2 | 10/2002 | Arnold et al. | |
| 6,597,956 B1 * | 7/2003 | Aziz et al. ..................... | 700/3 |
| 7,007,070 B1 * | 2/2006 | Hickman .................... | 709/208 |
| 2003/0187913 A1 * | 10/2003 | Falkner ...................... | 709/201 |
| 2004/0202160 A1 * | 10/2004 | Westphal ..................... | 370/389 |
| 2005/0015471 A1 * | 1/2005 | Zhang et al. ................. | 709/221 |
| 2006/0053216 A1 * | 3/2006 | Deokar et al. ............... | 709/223 |
| 2006/0195508 A1 * | 8/2006 | Bernardin et al. ........... | 709/203 |

OTHER PUBLICATIONS

A Flexible Security System for Metacomputing Environments Ferrari, Knabe, Humbhrey, Chapin, Grimshaw Dec. 1, 1998.
Fundamentals of Grid Computing Redbooks Paper, IBM Corp. Berstis, 2002.
Infrastructures For NASA's Information Power Grid Nears Completion Gridpoints Magazine, Summer 2000 http://www.nas.nasa.gove/gridpoints.

* cited by examiner

*Primary Examiner*—Carl Colin
*Assistant Examiner*—Chinwendu C Okoronkwo
(74) *Attorney, Agent, or Firm*—Jeffrey A. Proehl; Woods Fuller Shultz & Smith

(57) ABSTRACT

A method and system is disclosed for authenticating jobs submitted to a computing grid. The method may comprise receiving a grid job for performing on the computing grid, authenticating the grid job for performing on the computing grid, marking the grid job as authentic for acceptance by grid computers of the computing grid, and distributing the grid job marked as authentic to the grid computers. Additionally, a method and system is disclosed for screening jobs on the computing grid. The method may comprise receiving a grid job from a grid customer, deriving a pilot task from the grid job, executing a pilot run of the pilot task on a subset of grid computers on the computing grid, checking for successful performance of the pilot task on the subset of grid computers, and submitting the grid job to grid computers for performance if the pilot run of pilot task is successful.

5 Claims, 5 Drawing Sheets

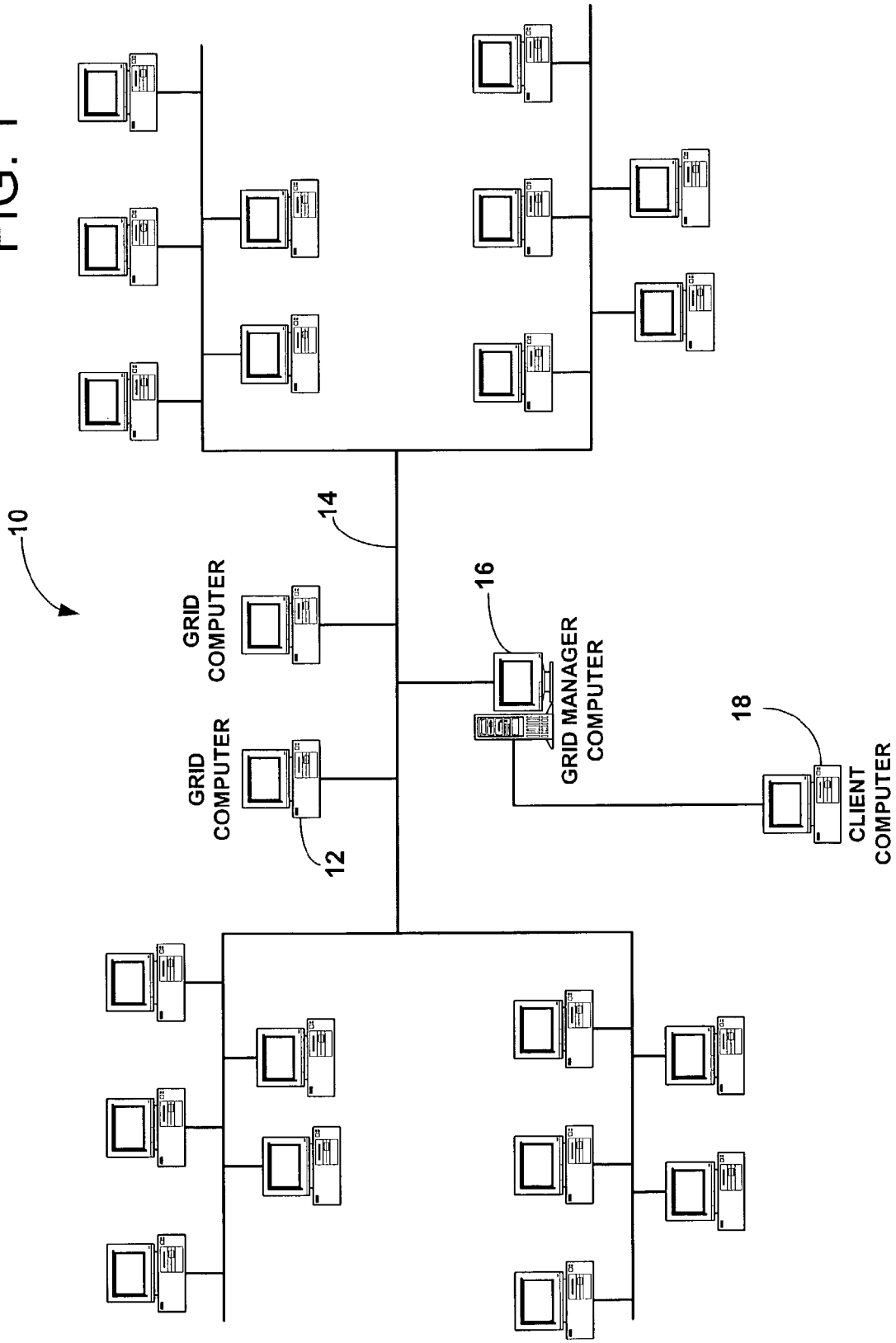

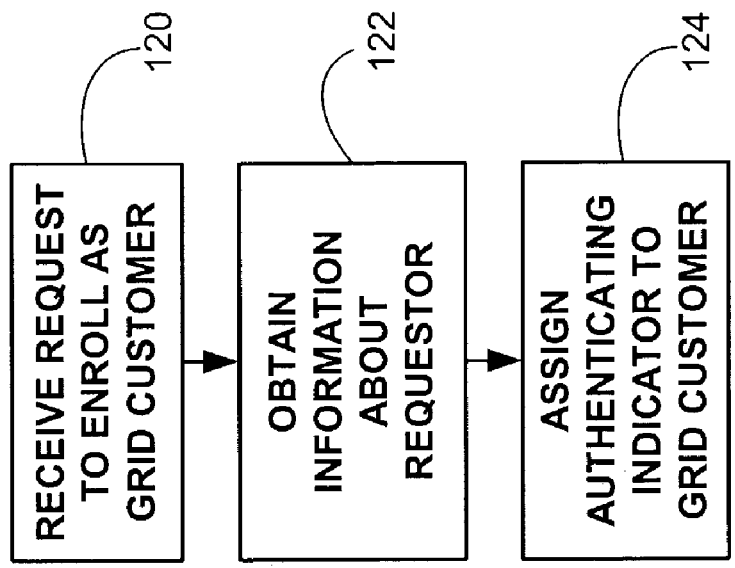
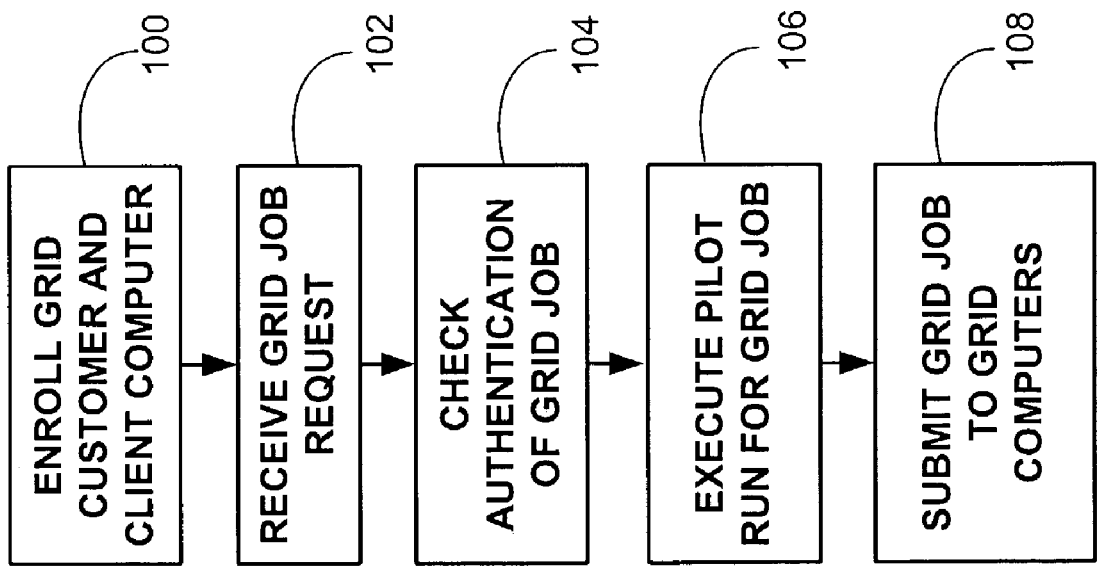

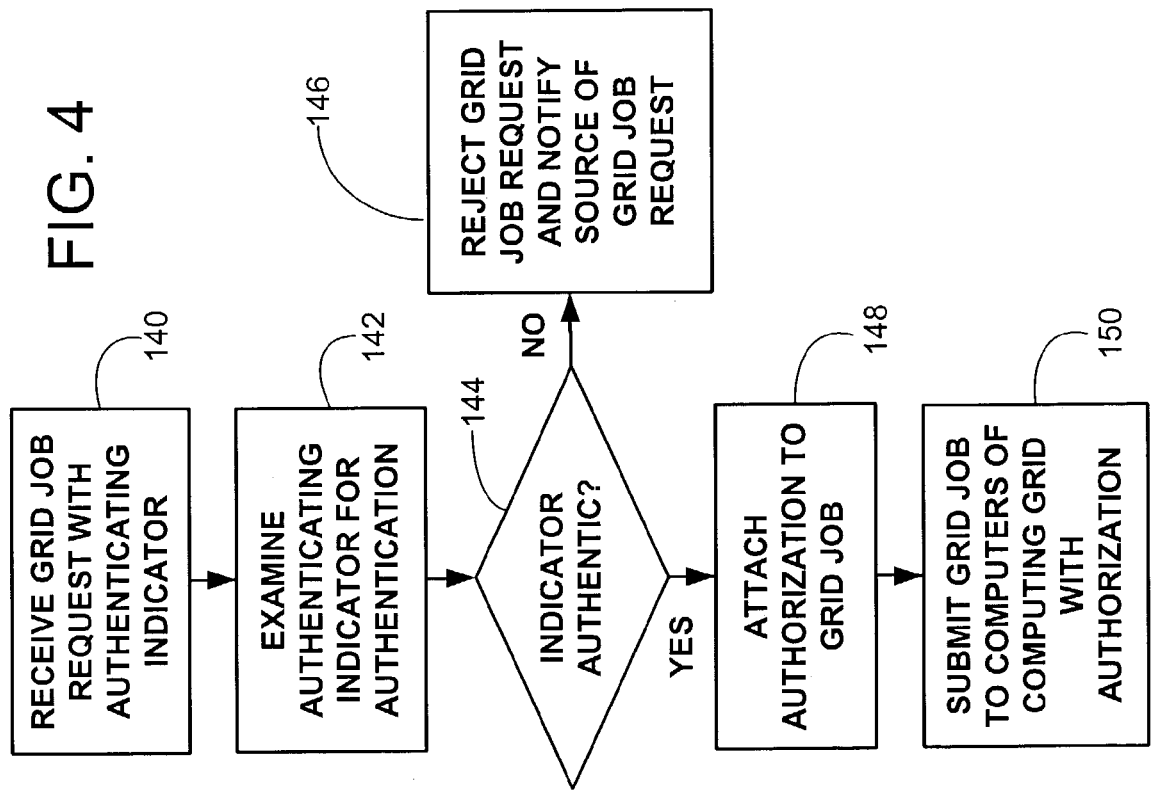

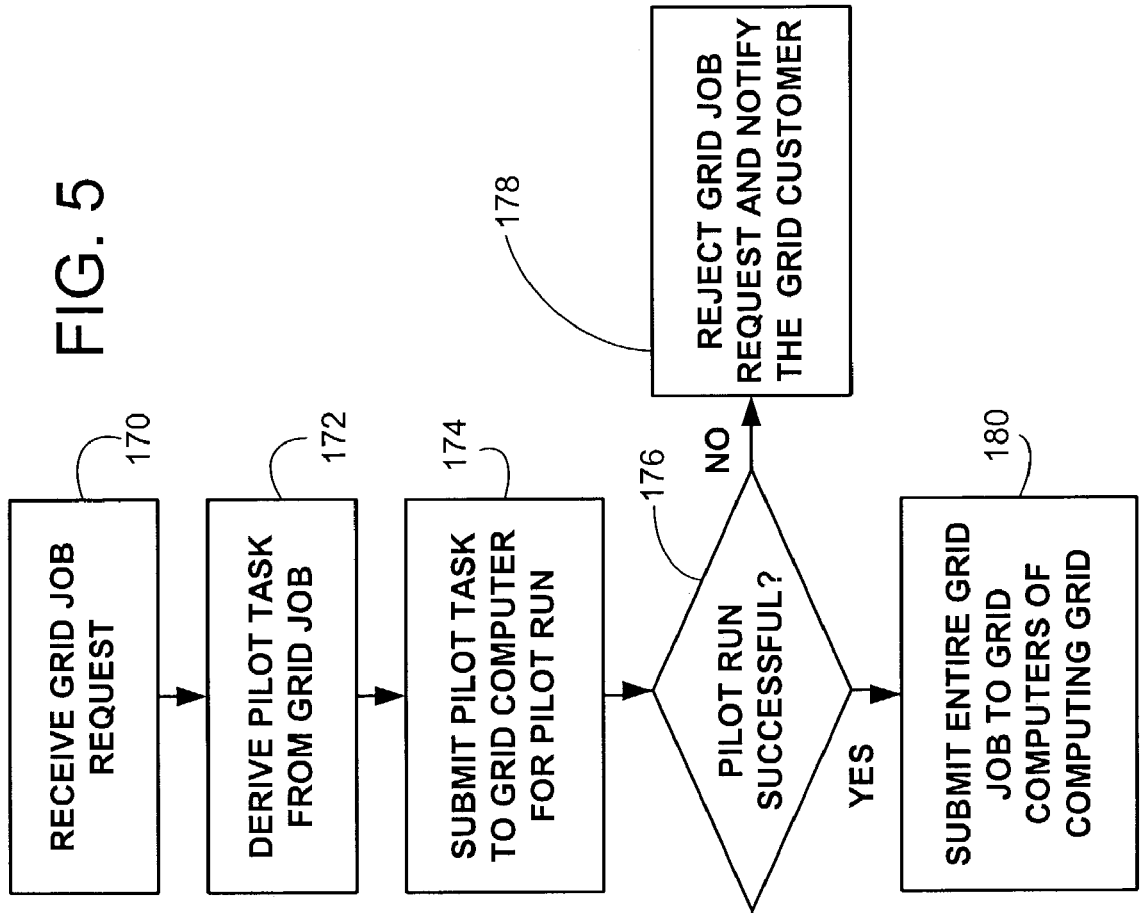

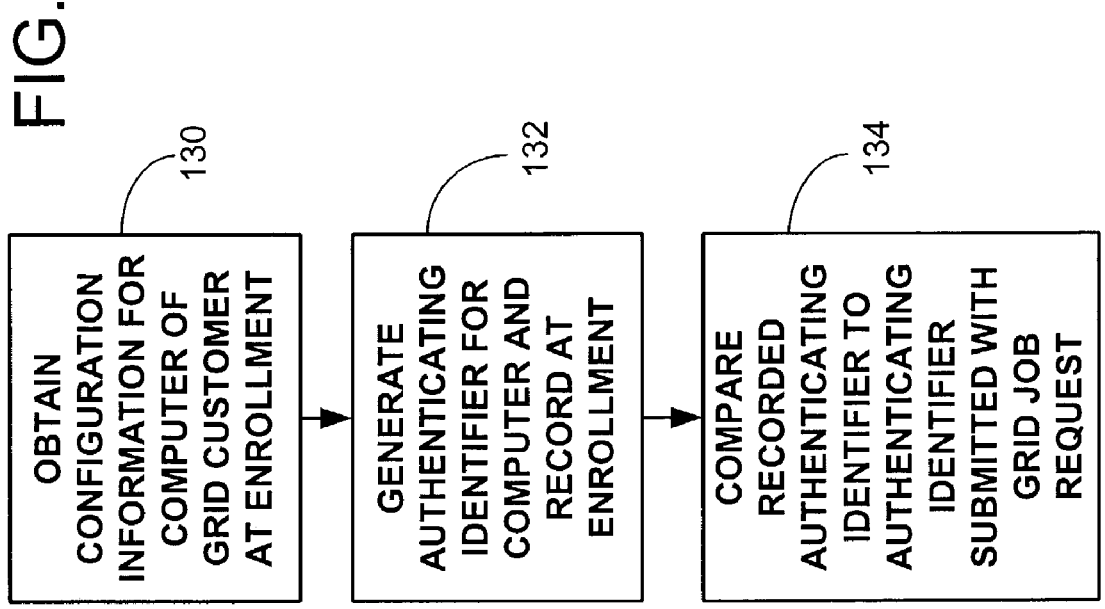

SYSTEM FOR AUTHENTICATING AND SCREENING GRID JOBS ON A COMPUTING GRID

BACKGROUND OF THE INVENTION

1. Field of the Invention

The present invention relates to grid computing systems and more particularly pertains to a system for authenticating and screening grid jobs on a computing grid in a secure and reliable manner.

2. Description of the Prior Art

Grid computing, which is sometimes referred to as distributed processing computing, has been proposed and explored as a means for bringing together a large number of computers of wide ranging locations and often disparate types for the purpose of utilizing idle computer processor time and/or unused storage by those needing processing or storage beyond their capabilities. While the development of public networks such as the Internet has facilitated communication between a wide range of computers all over the world, grid computing aims to facilitate not only communication between computers by also to coordinate processing by the computers in a useful manner. Typically, jobs are submitted to a managing entity of the grid system, and the job is executed by one or more of the grid computers making up the computing grid.

However, while the concept of grid computing holds great promise, the execution of the concept has not been without its challenges. One challenge associated with grid computing is ensuring that job requests submitted to the computing grid are authorized and legitimate, and will not negatively affect the computers of the computing grid when the jobs are performed.

The operation of a computing grid necessarily performs a large number of jobs on a large number of computers. As a result, there is a significant potential for erroneous, or even harmful, code contained in jobs submitted to the computing grid to be distributed to a large number of computers in a relatively short time period, and to cause problems on those computers. And because grid jobs are typically executed during times when the grid computers are not actively being operated so as to make grid operations as unobtrusive as possible, the primary users of the computers may not even become aware of problems with their computers until long after their computers have become disabled.

Thus, it becomes important to ensure that the grid job requests received by a computing grid are from legitimate and recognized sources to thereby reduce the likelihood that malicious code (including computer viruses and worms) will be submitted to and distributed over the computing grid. However, even legitimate and recognized grid customers may unintentionally submit jobs that have errors that make the jobs unable to be executed or that cause computers running the jobs to crash. Concerns about these potential problems can only serve to deter computer users from participating in computing grids, and thus impair the growth and success of the computing grids.

In view of the foregoing, it is believed that there is a significant need for a system that not only serves to identify job requests from legitimate sources, but also protects against erroneous jobs from causing operational problems on the computers of the computing grid.

SUMMARY OF THE INVENTION

In view of the forgoing concerns about protecting grid computers from malicious and erroneous job requests that may interfere with the primary functions of grid computers, the present invention discloses a system for authenticating and screening grid jobs on a computing grid.

In one aspect of the invention, a method and system is disclosed for authenticating jobs submitted to a computing grid. The method may comprise receiving a grid job for performing on the computing grid, authenticating the grid job for performing on the computing grid, marking the grid job as authentic for acceptance by grid computers of the computing grid, and distributing the grid job marked as authentic to the grid computers of the computing grid. The associated system includes means for performing the steps of the method.

In one optional implementation of the above method, authenticating the grid job includes examining an authenticating indicator that was submitted with the grid job by a grid customer. Further, the authenticating indicator may optionally be generated based upon a configuration of a client computer of the grid customer submitting the grid job. In one illustrative implementation of the invention, the authenticating indicator may be generated based upon Desktop Management Interface (DMI) information stored on the client computer, and more specifically on DMI information stored on a database of Management Information Files (MIF) resident on the client computer.

In another aspect of the invention, a method and system is disclosed for screening jobs on a computing grid. The method comprises receiving a grid job from a grid customer, deriving a pilot task from the grid job, executing a pilot run of the pilot task on a subset of grid computers on the computing grid, checking for successful performance of the pilot task on the subset of grid computers, and submitting the grid job to grid computers on the computing grid for performance if the pilot run of pilot task is successful. The associated system includes means for performing the steps of the method.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred implementations of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 1 is a schematic diagram of a computing grid system suitable for implementing the system of the present invention for authenticating and screening grid jobs on a computing grid.

FIG. 2 is a schematic flow diagram of an overall procedure that may be employed in the present invention for authenticating and assigning grid jobs on the computing grid.

FIG. 3 is a schematic flow diagram of an enrollment process that may be employed in the present invention.

FIG. 4 is a schematic flow diagram of an authentication process for authenticating grid job requests received by the computing grid system before the grid job is performed.

FIG. 5 is a schematic flow diagram of a process for executing a pilot run for a grid job request prior to submitting the grid job to grid computers of the computing grid.

FIG. 6 is a schematic flow diagram of a process for generating an authenticating indicator based upon the configuration of the computer of the grid customer.

DESCRIPTION OF PREFERRED EMBODIMENTS

With reference now to the drawings, and in particular to FIGS. 1 through 6 thereof, a system for authenticating and screening grid jobs on a computing grid system that embodies the principles and concepts of the present invention will be described.

Initially, for the purposes of clarity in this description, terminology used throughout this description will be defined so as to minimize any confusion with respect to the disclosure of the invention, with the understanding that various other names may be given to the disclosed elements, and this terminology is not intended to be construed as limiting the invention.

A grid system 10 (see FIG. 1) may comprise a plurality of grid computers 12 linked or interconnected together for communication therebetween (such as by a linking network 14), with a grid manager computer 16 designated to administer the grid system. In operation, a client computer 18 submits a job to the grid system 10, typically via the grid manager computer 16 which initially receives jobs for processing by the grid system. The client computer 18 may be one of the grid computers 12 on the grid system, or may be otherwise unrelated to the grid system 10. The grid manager 16 may be a computing grid server adapted for accepting jobs from the client computer 18, assigning and communicating the job to one of the grid computers 12, receiving results from the grid computer and communicating the final result back to the client computer. Optionally, the job may be submitted to more than one of the grid computers 12 of the system 10, and in that event the grid manager computer 16 may divide up or apportion the job into more than one subsidiary jobs, or tasks. The grid manager 16 then transmits the tasks to more than one grid computer 12 to be completed, and the results are returned to the grid manager, which correlates the results into a final result, and transmits them to the client computer 18.

In one embodiment of the invention, at least one of the grid computers 12 is located physically or geographically remote from at least one of the other grid computers, and in another embodiment, many or most of the grid computers are located physically or geographically remote from each other. The grid computers 12 and the grid manager computer 16 are linked in a manner suitable for permitting communication therebetween. The communication link between the computers may be a dedicated network, but also may be a public linking network such as the Internet.

In general, the present invention contemplates a process for authenticating, screening, and assigning grid jobs on a computing grid, and this process may comprise a number of subsidiary processes (FIG. 2). One of these processes involves the initial enrollment, or registration, of a grid customer and the client computer of the grid customer to authorize the grid customer to request the performance of grid jobs on the computing grid (block 100). Another of these processes involves the authentication of a grid job request to verify that the job has come from an enrolled grid customer (block 102). Yet another of these processes involves the screening of grid jobs by executing of a pilot run for the grid job to determine if the grid job will run successfully when the entire grid job is assigned to grid computers of the computing grid (block 106). Upon completion of one or more of these processes, the grid job is then submitted to one or more of the grid computers of the computing grid (block 108). It should be realized that not all of the subsidiary processes of the invention must be performed, and that various combinations of one or more of the processes that are disclosed herein may be employed on a computing grid in the practice of the invention.

In greater detail, the invention may include a process for enrolling a grid customer so that the grid customer is authorized to submit grid job requests to the computing grid and the requests will be accepted as authentic (FIG. 3). The grid customer may be associated with one of the grid computers 12 on the computing grid, or may be a client computer 18 that is not a part of the computing grid. As part of the enrollment process, an authenticating indicator may be generated and assigned to the grid customer. The authenticating indicator may be submitted with any grid job requests of the grid customer when the requests are transmitted to the grid manager for processing by the computing grid. The authenticating indicator permits the grid manager to verify that the submitted grid job was transmitted by an enrolled grid customer, and the authenticating indicator may be supplied to the grid customer as part of an initial enrollment process for the customer.

In one implementation of the invention, the authenticating indicator may comprise a pre-authorized identity code that is assigned to the grid customer at enrollment. The pre-authorized identity code is submitted with grid job requests to the computing grid by the grid customer. The pre-authorization identity code may be different for each grid customer. The grid manager may examine the authorized identity code to determine if the identity code is authentic, such as by comparing the code to a database listing of enrolled customers and authorized identity codes.

In another implementation of the invention, the authenticating indicator comprises a biometric signature that is associated with the grid customer, and is submitted with grid job requests of the grid customer to the computing grid. Again, the biometric signature may be recorded in a database at the enrollment of the grid customer. The biometric signature may be examined by the grid manager for authenticity by comparing the biometric signature of the submitted grid job with a biometric signature stored on the database.

In yet another implementation of the invention, the authenticating indicator includes or is based upon identifying characteristics or attributes of the client computer used by the grid customer. These identifying characteristics may be based upon the particular configuration of the client computer. The factors that constitute the configuration of the client computer may involve various hardware and software aspects of the client computer. For example, for each hardware component on the client computer and each software application resident on the client computer, the identifying characteristics may include the product name, the version, the serial number, etc. Further, for the hardware of the client computer, the identifying characteristics may include characteristics of the speed of the processor, the size of the memory, and the amount of storage resident on the computer.

In another implementation of the invention, the identifying characteristics are taken from a database on the client computer that contains Management Information Format (MIF) files that are maintained on the client computer as part of the Desktop Management Interface (DMI) specification established by the Desktop Management Task Force. As a function of the DMI system, the MIF files in the MIF database on the client computer are updated and changed when new hardware and software components are added or deleted from the client computer system. The MIF file database may include up to 255 (or more) attributes of the client computer, and thus an authenticating indicator incorporating aspects of the information in the MIF files on the attributes of the client computer may be highly unique to the client computer. The information in the MIF file database may be reported to the computing grid (see FIG. 6) at the time of enrollment as a grid customer (block 130) and the authenticating identifier may be generated and recorded (block 132) by the computing grid. The authenticating indicator may be generated from the MIF file information at each submission of a grid job request to the computing grid, and the authenticating indicator may be compared to the authenticating indicator that was generated at the time of the enrollment of the client computer as a grid customer (block 134). A difference between the authenticating indicator associated with a grid job request and the authenticating indicator generated at the time of enrollment may indicate that the request does not originate from a valid grid customer, or that the configuration of the client computer of the grid customer has changed since the time of enrollment. Since the addition or deletion of various hardware or software components on the client computer would cause a change in the MIF file database and to the authenticating indicator generated therefrom, the grid customer may be required to reenroll the client computer on the computing grid when changes are made in the configuration of the client computer so that subsequent grid job requests are accepted.

The use of identifying characteristics of the client computer, and especially the DMI information, to generate an authenticating identifier may permit the computing grid to keep informed of changes in the configuration of the client computer. This is especially useful when a grid customer submits grid job requests through one of the grid computers of the computing grid, as the computing grid system may thus be notified of changes to one of the grid computers that might not otherwise be reported by the user of the grid computer.

Another aspect of the invention contemplates a process of authenticating grid job requests that are received by the computing grid so that unauthorized, spurious, dangerous, or even malicious job requests may be rejected so that they are not submitted to the grid computers of the computing grid. (FIG. 4)

Initially, a grid job request with a grid job is received by the computing grid (block 140). The grid job request may be received by the grid manager 16, or another entity on the computing grid that has the responsibility for handling grid job requests. The authenticating process includes examining the authenticating indicator associated with a grid job request (block 142), and the authenticating indicator is compared to known and authorized authenticating indicators, such as may be maintained on a database of authenticating indicators (block 144). If the authenticating indicator is determined to not be authentic, the grid job request is rejected and the entity submitting the grid job request may be notified (block 146)

If the authenticating indicator is found to be authentic and the grid job request is therefore authenticated, the grid job request may be marked as having been authenticated so that grid computers on the computing grid may accept the grid job request as authentic when the grid job is received by the grid computers (block 148). At this point, the grid job may be submitted to one or more of the grid computers (unless further processes of the invention are to be completed before the grid job is assigned) with the authentication mark (block 150). The grid computer or computers that receive the grid job or tasks may then check the grid job request for the authentication applied by the grid manager before performing the grid job. If the grid computer detects that the grid job includes the authentication, the grid job is performed by the grid computer and the results returned to the computing grid.

Another significant aspect of the invention contemplates a method of determining the ability of a grid job request to be performed on the computing grid prior to engaging in full scale execution of the grid job by one or more grid computers of the computing grid (FIG. 5). When the grid job request is received (block 170), the grid job may be broken down into a plurality of smaller portions or units, or pilot tasks, each of which is generally representative of the particular steps of processing involved in performing the entire job request (block 172). The derivation of the grid job into a pilot task may involve, for example, performing a portion of the processing of the grid job on the data included with the grid job, or performing all of the processing of the grid job on only a small portion of the data included in the grid job request. Those skilled in the art will recognize that there are many ways of creating a smaller scale representation or prototype of a grid job for execution in a manner that will indicate the success of processing the entire grid job. Optionally, the pilot task may be representative of the portion of the grid job that might be assigned to a single grid computer when the entire grid job is processed.

Once a pilot task has been derived, a pilot run of the grid job may be executed on the pilot task by submitting the pilot task to a subset of grid computers on the computing grid (block 174). The subset of grid computers on the computing grid may comprise a single computer, or more than one computer, but may typically comprise fewer grid computers than would be employed to perform the entire grid job on the computing grid. The grid computer or computers of the subset may then perform a representative run so that potential problems with the performance of the entire grid job may be detected prior to the submission of the entire grid job to one or more grid computers on the computing grid.

Once the pilot job has been submitted to a grid computer for execution, the grid computer may be checked or polled to determine if the grid task was successfully performed by the grid computer (block 176). If the pilot run of the pilot task is determined to not have been successful, the grid job request may be rejected and the client computer may be notified of the rejection (block 178). If the pilot run of the pilot task is determined to be successful, then the grid job may be submitted to grid computers on computing grid for performance of the entire grid job that was requested by the grid customer (block 180).

In employing this aspect of the invention, potential problems with processing the grid job may be detected prior to dedicating significant grid resources to the performance of the entire grid job, and thus operational problems that might occur on a large number of the grid computers may be avoided. This may thereby help to prevent the tying up, or possible loss of, grid resources due to a intended to disrupt operation of the computing grid by disabling the grid computers constituting the computing grid.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

I claim:

1. A method of screening jobs on a computing grid, comprising:
   receiving a grid job from a grid customer;
   deriving a pilot task from the grid job;
   executing a pilot run of the pilot task on a subset of grid computers on the computing grid;
   checking for successful performance of the pilot task on the subset of grid computers; and
   submitting the grid job to grid computers on the computing grid for performance if the pilot run of pilot task is successful;
   wherein the pilot task comprises a portion of the grid job received from the grid customer.

2. The method of claim 1 wherein deriving the pilot task comprises dividing the grid job into a number of smaller tasks; and
   wherein executing the pilot run comprises submitting at least one of the smaller tasks to at least one grid computer to be performed by the at least one grid computer.

3. The method of claim 1 wherein deriving the pilot task comprises dividing data associated with the grid job into a number of smaller portions; and
   wherein executing the pilot run comprises submitting the grid job with at least one of the smaller portions of the data to at least one grid computer to be performed by the at least one grid computer.

4. The method of claim 1 additionally comprising rejecting the grid job if the pilot run of the pilot task is unsuccessful.

5. The method of claim 4 additionally comprising notifying the grid customer submitting the grid job of the rejection of the grid job if the pilot run of the grid task is unsuccessful.

* * * * *